(12) United States Patent
Sakata

(10) Patent No.: US 9,434,839 B2
(45) Date of Patent: Sep. 6, 2016

(54) POLYBUTYLENE TEREPHTHALATE RESIN COMPOSITION AND WELDED BODY

(71) Applicant: WinTech Polymer Ltd., Tokyo (JP)

(72) Inventor: Kouichi Sakata, Fuji (JP)

(73) Assignee: WinTech Polymer Ltd., Tokyo (JP)

( * ) Notice: Subject to any disclaimer, the term of this patent is extended or adjusted under 35 U.S.C. 154(b) by 18 days.

(21) Appl. No.: 14/348,084

(22) PCT Filed: Sep. 27, 2012

(86) PCT No.: PCT/JP2012/074986
§ 371 (c)(1),
(2) Date: Mar. 28, 2014

(87) PCT Pub. No.: WO2013/047708
PCT Pub. Date: Apr. 4, 2013

(65) Prior Publication Data
US 2014/0322551 A1    Oct. 30, 2014

(30) Foreign Application Priority Data

Sep. 30, 2011    (JP) .................................. 2011-216224

(51) Int. Cl.
*C08L 67/02*    (2006.01)
*C08L 67/03*    (2006.01)
(Continued)

(52) U.S. Cl.
CPC ............... *C08L 67/03* (2013.01); *B32B 27/36* (2013.01); *C08K 7/14* (2013.01); *C08L 67/02* (2013.01); *B29C 65/02* (2013.01); *B29C 65/06* (2013.01); *B29C 65/0609* (2013.01); *B29C 65/08* (2013.01); *B32B 37/04* (2013.01); *B32B 37/06* (2013.01); *B32B 2367/00* (2013.01); *C08G 63/16* (2013.01);
(Continued)

(58) Field of Classification Search
None
See application file for complete search history.

(56) References Cited

U.S. PATENT DOCUMENTS 3,919,353 A * 11/1975 Castelnuovo ........... C08L 67/02
525/64
4,022,748 A *  5/1977 Schlichting ............. C08L 67/02
523/219
(Continued)

FOREIGN PATENT DOCUMENTS

CN    101175804 A    5/2008
CN    101495569 A    7/2009
(Continued)

OTHER PUBLICATIONS

Office Action issued to CN Application No. 201280044921.7, mailed Aug. 8, 2014.
(Continued)

*Primary Examiner* — Vivian Chen
(74) *Attorney, Agent, or Firm* — Knobbe Martens Olson and Bear, LLP

(57) ABSTRACT

To provide a polybutylene terephthalate resin composition offering excellent flowability, wherein the resin composition raises the weld strength and heat shock resistance of a welded body obtained by welding together molded products obtained by molding the polybutylene terephthalate resin composition.

[Solution] A polybutylene terephthalate resin composition comprising a polybutylene terephthalate resin (A) having a weight-average molecular weight of 60,000-80,000 inclusive and an inorganic filler (B). Preferably, also included is 5-20 mass parts of an elastomer (C) relative to 100 mass parts of the polybutylene terephthalate resin (A).

3 Claims, 2 Drawing Sheets

(a)

(b)

(51) Int. Cl.

| | | |
|---|---|---|
| *C08J 5/12* | (2006.01) | |
| *B29C 65/02* | (2006.01) | |
| *B29C 65/06* | (2006.01) | |
| *B29C 65/08* | (2006.01) | |
| *B32B 27/36* | (2006.01) | |
| *B32B 37/04* | (2006.01) | |
| *B32B 37/06* | (2006.01) | |
| *C08K 7/14* | (2006.01) | |
| *C08G 63/181* | (2006.01) | |
| *C08G 63/183* | (2006.01) | |
| *C08G 63/16* | (2006.01) | |

(52) U.S. Cl.
CPC ........... *C08G 63/181* (2013.01); *C08G 63/183* (2013.01); *C08J 5/121* (2013.01); *C08J 2300/26* (2013.01); *C08J 2367/02* (2013.01); *C08J 2367/03* (2013.01); *Y10T 428/31786* (2015.04)

(56) References Cited

U.S. PATENT DOCUMENTS

| | | | | |
|---|---|---|---|---|
| 4,080,354 | A * | 3/1978 | Kramer | C08L 67/02 523/522 |
| 4,143,094 | A * | 3/1979 | Burzin et al. | 525/176 |
| 4,619,971 | A * | 10/1986 | Yates, III | C08L 67/02 525/166 |
| 4,717,752 | A | 1/1988 | Yates, III et al. | |
| 4,861,817 | A * | 8/1989 | Erpelding et al. | 524/411 |
| 5,034,474 | A * | 7/1991 | Hamilton | C08L 67/02 524/413 |
| 5,183,840 | A * | 2/1993 | Erpelding et al. | 524/228 |
| 5,674,928 | A | 10/1997 | Chisholm et al. | |
| 5,731,390 | A * | 3/1998 | Helmond | C08L 63/00 524/174 |
| 5,874,146 | A * | 2/1999 | Kagan | B29C 65/06 156/73.1 |
| 6,087,591 | A * | 7/2000 | Nguyen | C08L 67/02 174/110 R |
| 6,521,326 | B1 * | 2/2003 | Fischer | B32B 27/04 156/272.2 |
| 8,080,599 | B2 * | 12/2011 | Ding | C08L 67/02 524/126 |
| 2002/0188073 | A1 * | 12/2002 | Uno et al. | 525/166 |
| 2006/0142423 | A1 * | 6/2006 | Takayama et al. | 523/217 |
| 2007/0129475 | A1 * | 6/2007 | Sakata et al. | 524/306 |
| 2009/0181199 | A1 * | 7/2009 | Agarwal et al. | 428/36.8 |
| 2011/0160364 | A1 | 6/2011 | Toyohara et al. | |
| 2011/0256406 | A1 * | 10/2011 | Farrell et al. | 428/412 |
| 2011/0304817 | A1 | 12/2011 | Nakatsukasa et al. | |
| 2012/0028063 | A1 * | 2/2012 | Sakata | 428/480 |

FOREIGN PATENT DOCUMENTS

| | | | |
|---|---|---|---|
| CN | 101952367 A | | 1/2011 |
| CN | 103314053 A | | 9/2013 |
| EP | 0303077 A2 | | 2/1989 |
| EP | 0712899 A1 | | 5/1996 |
| EP | 0552546 | | 10/2010 |
| JP | 61-047746 | * | 3/1986 |
| JP | H05-179114 A | | 7/1993 |
| JP | 2000-095948 A | | 4/2000 |
| JP | 2000-302824 A | | 10/2000 |
| JP | 2006-176691 A | | 7/2006 |
| JP | 2006-310009 A | | 11/2006 |
| JP | 2009-097011 A | | 5/2009 |
| KR | 2003-0037354 | * | 5/2003 |
| KR | 2003-0037354 A | * | 5/2003 |
| WO | WO2007/027390 A1 | | 3/2008 |
| WO | WO 2010/122912 A1 | | 10/2010 |
| WO | WO 2010/122915 A1 | | 10/2010 |
| WO | WO 2012/095818 A1 | | 7/2012 |

OTHER PUBLICATIONS

Second Office Action issued to CN Application No. 201280044921.7, mailed Jan. 9, 2015.

Imaizumi, "Welding Technology and Hollowing Technology for Automotive Resin Components," Remarkable Advances in Extrusion/Blow/Expansion Molding Technology, vol. 55, No. 5, May 1, 2004, pp. 67-112, Japan.

Kazuo, Saturated Polyester Resin Handbook, Nikkan Kogyo Shimbun, Ltd., Dec. 22, 1989, pp. 298-301, Japan.

Notice of Reasons for Rejection issued to JP Application No. 2013-536409, mailed May 20, 2014.

Office Action issued to TW Application No. 101135768, mailed May 14, 2015.

Office Action issued to CN Application No. 201280044921.7, mailed May 11, 2015.

The extended European search report issued to EP Application No. 12834660.8, mailed Jun. 8, 2015.

* cited by examiner

POLYBUTYLENE TEREPHTHALATE RESIN COMPOSITION AND WELDED BODY

TECHNICAL FIELD

The present invention relates to a polybutylene terephthalate resin composition, and also relates to a resin composition which is excellent in moldability and exhibits high weld strength and heat shock resistance when plural molded products are welded together as a molded product, and a welded body obtained by welding molded products, each being composed of the resin composition, together.

BACKGROUND ART

A polybutylene terephthalate resin is used as an engineering plastic in a wide range of applications such as automobile parts and electric and electronic parts since it is excellent in mechanical properties, electrical properties and other physical and chemical properties, and satisfactory processability.

Among the above applications, there exists a case which accommodates a substrate or the like with electronic parts mounted thereon, and this case is obtained by bonding a lid with a body. Such case is used to protect parts such as a substrate accommodated inside the case from moisture, dust, and impact from the outside, thus requiring sufficient adhesion between the lid and the body.

There has been known, as a bonding method which can enhance bonding strength between the lid and the body, and is also simple and easy, welding methods such as a vibration welding method and an ultrasonic welding method. The above welding method is preferably employed for bonding the lid with the body in the case as mentioned above, and is also preferably employed for bonding molded products, each being composed of not only the polybutylene terephthalate resin but also other resins, together.

For example, Patent Document 1 discloses the technology for bonding a lamp housing made of a thermoplastic resin composition with a lens made of a polymethyl methacrylate resin or a polycarbonate resin using a vibration welding method to produce an automobile lamp. As mentioned above, the technology for bonding molded products together using a welding method has hitherto been known. However, the mechanical strength of a welded body must be taken into consideration in actual product development. In Patent Document 1, a raw material composing the lamp housing is a rubbery graft copolymer obtained by polymerizing a methyl methacrylate monomer with an ethyl acrylate monomer, or a resin composition containing a polycarbonate resin and a polyalkylene terephthalate resin. This resin composition has low rigidity and is inferior in heat resistance such as deflection temperature under load. Therefore, even if a case accommodating a substrate is produced using the technology disclosed in Patent Document 1, a problem of mechanical strength arises, thus failing to obtain a case having desired performances. Patent Document 1 discloses only appearance (melting width) as vibration weldability, and does not make a suggestion about the weld strength.

Patent Document 2 discloses a polybutylene terephthalate resin composition for the production of a molded product to be subjected to vibration welding. The resin composition disclosed in Patent Document 2 contains a modified polyester copolymer containing 5 to 30 mol % of a comonomer. Since heat resistance of the molded product deteriorates when using this modified polyester copolymer, it is impossible to obtain a case having desired performances even if a case accommodating a substrate is produced using the technology disclosed in Patent Document 2.

Patent Document 3 discloses a polyamide resin composition for the production of a molded product to be subjected to vibration welding. Patent Document 3 discloses that the viscosity upon melting of resin composition may be increased so as enhance weld strength between molded products.

[Patent Document 1] Japanese Unexamined Patent Application, Publication No.2000-302824
[Patent Document 2] Japanese Unexamined Patent Application, Publication No.2006-176691
[Patent Document 3] Japanese Unexamined Patent Application, Publication No.2009-97011

DISCLOSURE OF THE INVENTION

Problems to be Solved by the Invention

As mentioned above, Patent Document 3 discloses that the weld strength is enhanced when the viscosity upon melting of a resin composition composing a molded product to be welded is increased. However, high viscosity means that flowability of the resin composition in the production of a molded product deteriorates.

Due to the lack of flowability of the resin composition during molding, the shape of a moldable molded product is limited. Particularly, in case an inorganic filler is added so as to impart mechanical strength etc. required to an actual product, flowability is more likely to deteriorate. Therefore, the technology required now is that for enhancing weld strength having a certain level or higher of flowability upon melting.

Means for Solving the Problems

The present inventors have intensively studied with respect to a welded body obtained by welding molded products, each being composed of a polybutylene terephthalate resin composition, together so as to solve the above-mentioned problems. In that case, the present inventors have found that, in a polybutylene terephthalate resin composition, the weld strength may not be sometimes enhanced even if the viscosity of a resin composition upon melting is increased, and also found that the molecular weight of a polybutylene terephthalate resin contained in a resin composition has a relation with the weld strength in the case of a polybutylene terephthalate resin composition, and that control of the molecular weight within a specific range enables control of flowability of a resin composition composing a molded product to a certain level or higher while enhancing the weld strength between molded products composing a welded body. Thus, the present invention has been completed. More specifically, the present invention provides the followings.

(1) A polybutylene terephthalate resin composition including a polybutylene terephthalate resin (A) having a weight-average molecular weight of 60,000 or more and 80,000 or less, and an inorganic filler (B).

(2) The polybutylene terephthalate resin composition according to (1), which contains an elastomer (C) in an amount of 5 to 20 parts by mass based on 100 parts by mass of the polybutylene terephthalate resin (A).

(3) A welded body obtained by welding molded products, each being composed of the polybutylene terephthalate resin composition according to (1) or (2), together.

(4) The welded body according to (3), which is obtained by abutting the molded products together to generate frictional heat on an abutting surface, thus welding the molded products together.

Effects of the Invention

A resin composition of the present invention is excellent in flowability, and also a welded body obtained by welding molded products, each being composed of the resin composition of the present invention, together has strong weld strength between molded products.

The molded product obtained by molding the resin composition of the present invention can be preferably used as a case accommodating electronic parts, and a molded product for cover or housing by making use of high flowability of a resin composition serving as a raw material, strong weld strength between molded products when formed into a welded product, and excellent physical properties possessed by a polybutylene terephthalate resin.

BRIEF DESCRIPTION OF THE DRAWINGS

FIG. 1 is a cross-section view schematically showing two molded products to be subjected to vibration welding, in which FIG. 1(a) is a view showing the whole and FIG. 1(b) is an enlarged view of a portion A surrounded by a dotted line in FIG. 1(a).

FIG. 2 is a cross-section view schematically showing two molded products to be subjected to ultrasonic welding, in which FIG. 2(a) is a view showing the whole and FIG. 2(b) is an enlarged view of a portion C surrounded by a dotted line in FIG. 2(a).

PREFERRED MODE FOR CARRYING OUT THE INVENTION

Figure 1:
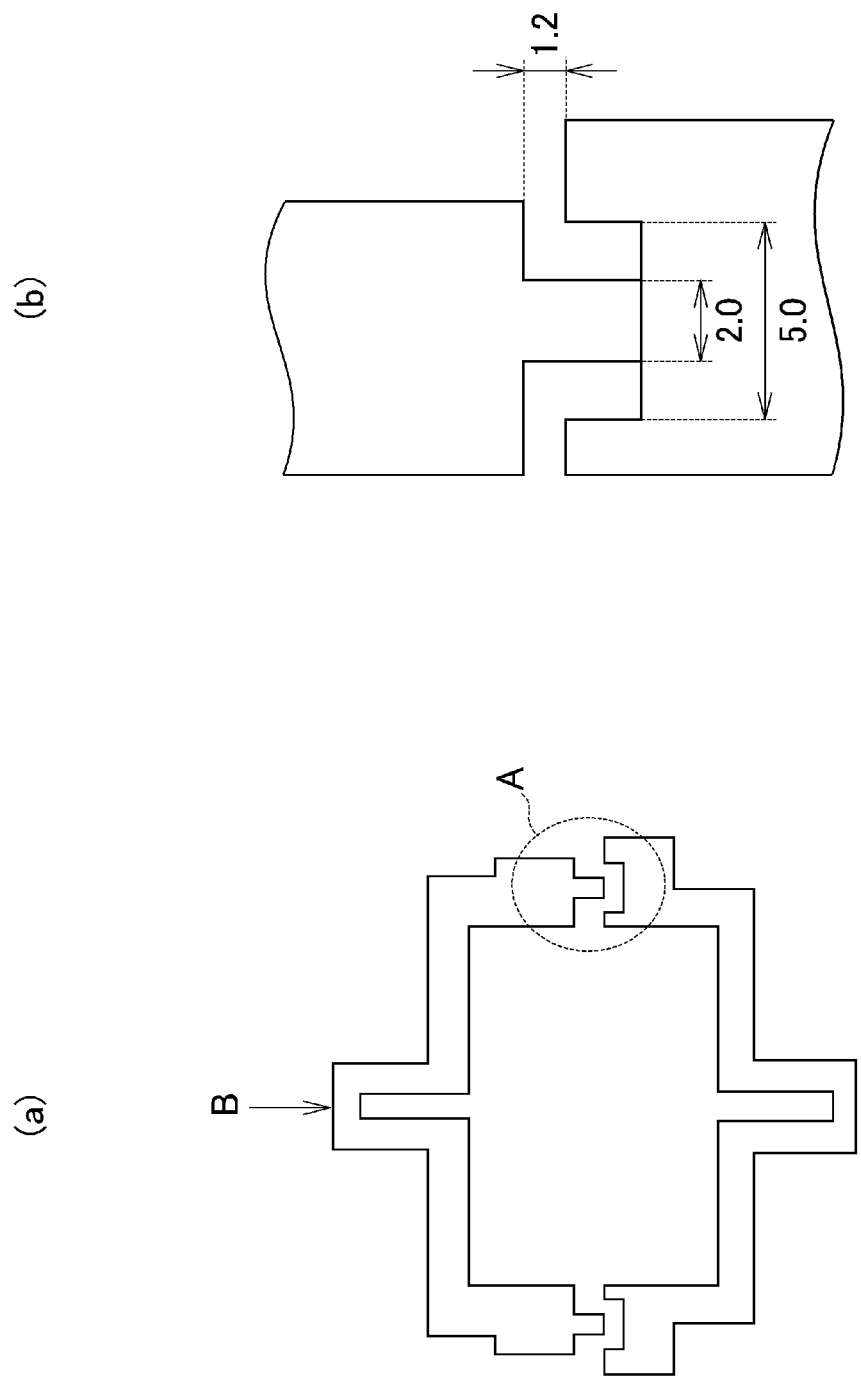

Constituents of the polybutylene terephthalate resin composition of the present invention will be sequentially described in detail below.

Polybutylene Terephthalate Resin (A)

First, a polybutylene terephthalate resin (A) as a base resin of the resin composition of the present invention is a polybutylene terephthalate resin obtained by polycondensing terephthalic acid with a glycol component containing an alkylene glycol having 4 carbon atoms (1,4-butanediol) or an ester-forming derivative thereof.

In the present invention, the polybutylene terephthalate resin is an unmodified polybutylene terephthalate resin including a repeating unit derived from terephthalic acid and a repeating unit derived from 1,4-butanediol.

In order to enhance the weld strength between welded molded products, a so-called modified polybutylene terephthalate resin including repeating units derived from monomers other than terephthalic acid and 1,4-butanediol may be sometimes used. According to the present invention, it is also possible to enhance the weld strength between welded molded products by using an unmodified polybutylene terephthalate resin. Therefore, the unmodified polybutylene terephthalate resin is preferably used from the viewpoint of heat resistance.

The polybutylene terephthalate resin (A) has a weight-average molecular weight of 60,000 or more and 80,000 or less. When the weight-average molecular weight is less than 60,000, the weld strength between welded molded products to be welded is not enhanced, although flowability during molding is excellent. When the weight-average molecular weight is more than 80,000, it is impossible to obtain flowability required to produce a molded product by injection molding since the viscosity becomes significantly high. From the viewpoint of weld strength and flowability, the weight-average molecular weight of the polybutylene terephthalate resin (A) is more preferably 65,000 or more and 75,000 or less, and still more preferably, 65,000 or more and 70,000 or less.

When the weight-average molecular weight of the polybutylene terephthalate resin (A) is within the above range, heat resistance of the polybutylene terephthalate resin (A) also becomes higher. As used herein, heat resistance refers to a crystallization temperature (Tc) measured at a temperature raising rate of 10° C./minute and a temperature falling rate of −10° C./minute by differential scanning calorimetry (DSC), and the crystallization temperature is preferably 190° C. or higher. When the weight-average molecular weight of the polybutylene terephthalate resin (A) is within the above range, heat shock resistance of a welded body composing a resin composition becomes satisfactory.

It is also possible to control the weight-average molecular weight by blending a polybutylene terephthalate resin having a different weight-average molecular weight. For example, it is possible to prepare a polybutylene terephthalate resin having a weight-average molecular weight of 70,000 by blending a polybutylene terephthalate resin having a weight-average molecular weight of 50,000 with a polybutylene terephthalate resin having a weight-average molecular weight of 100,000.

Inorganic Filler (B)

Any known glass fiber is preferably used as an inorganic filler (B) used in the present invention. There is no particular limitation on a glass fiber diameter of a glass fiber; a shape such as a cylindrical shape, a cocoon shape, or an oval cross section; a length of the glass fiber, and a glass cutting method used to produce a chopped strand, a roving and the like. In the present invention, types of glass are not also limited. In view of quality, E glass, and corrosion-resistant glass containing a zirconium element in the composition are preferably used.

In the present invention, glass fibers subjected to a surface treated with organic treatment agents such as an aminosilane compound and an epoxy compound are preferably used for the purpose of improving interfacial quality of a glass fiber and a resin matrix. Among these glass fibers, particularly preferably used is a glass fiber in which the amount of the organic treatment agent indicated by a heating loss value is 1% by mass or more. It is possible to preferably use, as the aminosilane compound and the epoxy compound used in these glass fibers, any known compound. In the present invention, there is no particular limitation on types of the aminosilane compound and the epoxy compound used for a surface treatment of glass fibers.

Examples of the inorganic filler used in the present invention include non-fibrous fillers such as glass beads, glass flake, silica, kaolin, talc, clay, wollastonite, titanium oxide, zinc oxide, alumina, calcium carbonate, and magnesium carbonate. When these inorganic fillers are used alone, a molded body having sufficient strength cannot be obtained. Therefore, these inorganic fillers are desirably used in combination with fibrous fillers. If necessary, a treatment with a surface treatment agent etc. may be applied to these inorganic fillers.

It is preferred that the amount of these inorganic fillers (B) to be added is appropriately selected without impairing flowability required to molding while imparting mechanical strength etc. required to actual products.

Elastomer (C)

In applications where an ultrasonic welding method and a vibration welding method are applied, metal terminals such as a connector and various sensor parts may be sometimes integrated with a molded product. In applications of parts which are particularly mounted in automobiles, high durability in high temperature and high humidity environment and heating/cooling cycle environment is often required. Therefore, elastomers may be added so as to improve heating/cooling cycle life.

A thermoplastic elastomer and a core shell elastomer or the like are useful as the elastomer (C), and examples of the thermoplastic elastomer include olefin-, styrene-, and polyester-based elastomers.

The olefin-based elastomer is preferably a copolymer containing ethylene and/or propylene as main component(s). It is possible to suitably use a graft copolymer in which an olefin-based copolymer composed of (a-1) an ethylene-unsaturated carboxylic acid alkyl ester copolymer or (a-2) a glycidyl ester of an α-olefin and an α,β-unsaturated acid, and (b) one, or two or more polymer(s) or copolymer(s) composed mainly of a repeating unit represented by the general formula (1) shown below are chemically bonded in a manner to form a branched or cross-linked structure.

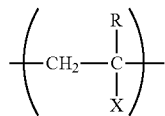

(1)

In the formula (3), R represents a hydrogen atom or a lower alkyl group (for example, a C1-C6 alkyl group), and X represents one or more groups selected from the group consisting of —COOCH$_3$, —COOC$_2$H$_5$, —COOC$_4$H$_9$, —COOCH$_2$CH(C$_2$H$_5$)C$_4$H$_9$, a phenyl group, and a cyano group.

Such graft copolymer is particularly effective to improve heat shock resistance. Specific examples of the ethylene-unsaturated carboxylic acid alkyl ester copolymer (a-1) include random copolymers such as an ethylene-acrylic acid copolymer, an ethylene-methacrylic acid copolymer, an ethylene-acrylic acid-ethyl acrylate copolymer, an ethylene-ethyl acrylate copolymer, an ethylene-vinyl acetate copolymer, and an ethylene-vinyl acetate-ethyl acrylate copolymer, and these copolymers can be used in combination as a mixture.

Examples of the α-olefin as one monomer composing the olefin-based copolymer (a-2) include ethylene, propylene, butene-1 and the like, and ethylene is preferably used. The glycidyl ester of an α,β-unsaturated acid as the other monomer composing the component (a-2) is a compound represented by the general formula (2) shown below, and examples thereof include an acrylic acid glycidyl ester, a methacrylic acid glycidyl ester, an ethacrylic acid glycidyl ester and the like, and a methacrylic acid glycidyl ester is used particularly preferably.

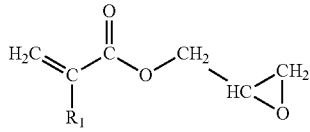

(2)

In the formula (4), R1 represents a hydrogen atom, or a lower alkyl group (for example, a C1-C6 alkyl group).

It is possible to obtain the copolymer (a-2) by copolymerizing an α-olefin (for example, ethylene) with a glycidyl ester of an α,β-unsaturated acid by a usually well known radical polymerization reaction. A segment (a-2) is suitably composed of 70 to 99% by mass of an α-olefin, and 30 to 1% by mass of a glycidyl ester of an α,β-unsaturated acid.

Next, the polymer or copolymer (b) to be graft polymerized with this olefin-based copolymer (a-1) or (a-2) is a homopolymer composed of one repeating unit represented by the above general formula (1), or a copolymer composed of two or more repeating units. Examples thereof include polymethyl methacrylate, polyethyl acrylate, butyl polyacrylate, 2-ethylhexyl polyacrylate, polystyrene, polyacrylonitrile, an acrylonitrile-styrene copolymer, a butyl acrylate-methyl methacrylate copolymer, a butyl acrylate-styrene copolymer and the like, and a butyl acrylate-methyl methacrylate copolymer is particularly preferable. Such polymer or copolymer (b) is also prepared by radical polymerization of the corresponding vinyl-based monomer.

The graft copolymer used in the present invention is characterized in that it is not an olefin-based copolymer (a-1) or (a-2), or a (co)polymer (b) ((co)polymer represents a copolymer or a homopolymer) alone, but is a graft copolymer having a branched or crosslinked structure in which a copolymer (a-1) or (a-2) is chemically bonded with a (co)polymer (b) at at least one point. As mentioned below, significant effect, which cannot be obtained by simply single use of the copolymer (a-1), (a-2) or (b) alone, is obtained by having a graft structure. A ratio of (a-1) or (a-2) and (b), which composes the graft copolymer, is suitably from 95:5 to 5:95 (mass ratio), and preferably from 80:20 to 20:80.

The styrene-based elastomer is preferably a block copolymer etc. composed of a polystyrene block and an elastomer block of a polyolefin structure. Examples of such block copolymer include a polystyrene-polyisoprene-polystyrene block copolymer (SIS), a polystyrene-poly (ethylene/propylene)-polystyrene block copolymer (SEPS), a polystyrene-poly(ethylene/butylene)-polystyrene block copolymer (SEBS), a polystyrene-poly(ethylene-ethylene/propylene)-polystyrene block copolymer (SEEPS) and the like. Such styrene-based thermoplastic elastomer is a block copolymer composed of an aromatic vinyl compound and an olefin-based compound or a conjugated diene compound.

A core shell type elastomer is a polymer having a multi-layered structure composed of a core layer (core portion), and a shell layer which partially or entirely covers the core layer (surface of core layer). In the core shell type elastomer, the core layer is composed of a rubber component (soft component) and, particularly, an acrylic rubber component is also desirable. A glass transition temperature of the rubber component may be, for example, lower than 0° C. (for example, −10° C. or lower), preferably −20° C. or lower (for example, about −180 to −25° C.), and more preferably −30° C. or lower (for example, about −150 to −40° C.)

The acrylic rubber as a rubber component is a polymer containing, as a main component, an acrylic monomer [particularly, an alkyl acrylate (an acrylic acid C1-12 alkyl ester such as butyl acrylate, preferably an acrylic acid C1-8 alkyl, and more preferably an acrylic acid C2-6 alkyl ester)]. The acrylic rubber may be either a homopolymer or a copolymer (copolymer of acrylic monomers, copolymer of an acrylic monomer and the other unsaturated bond-containing monomer, etc.) of an acrylic monomer, or a copolymer of an acrylic monomer (and the other unsaturated bond-containing monomer) and a cross-linkable monomer.

Next, the polyester-based elastomer can be classified into polyether type and polyester type elastomers, and any elastomer can be used as long as the flexural modulus is 1,000 MPa or less, and preferably 700 MPa or less. When the flexural modulus is more than 1,000 MPa, it becomes impossible to obtain sufficient flexibility. The polyether type elastomer is a polyester elastomer including an aromatic polyester as a hard segment, and a polyester consisting of a polymer of oxyalkylene glycol and dicarboxylic acid as a soft segment. The aromatic polyester unit in the hard segment is a polycondensate of a dicarboxylic acid compound and a dihydroxy compound, a polycondensate of an oxycarboxylic acid compound, or a polycondensate of these three component compounds. For example, polybutylene terephthalate is used as the hard segment. A compound obtained by polycondensing polyalkylene ether with dicarboxylic acid is used as the soft segment. For example, an ester compound of polyoxytetramethylene glycol derived from tetrahydrofuran is used.

The polyester type elastomer is a polyester elastomer including an aromatic polyester as a hard segment, and an amorphous polyester as a soft segment. The aromatic polyester unit in the hard segment is the same as that of the above polyether type elastomer. The soft segment is a ring-opened polymer of lactone, i.e. polylactone, or an aliphatic polyester derived from an aliphatic dicarboxylic acid and an aliphatic diol.

There is no particular limitation on types of the elastomer used in the present invention. An elastomer having a glycidyl group is preferable since it is excellent in adhesion to a polybutylene terephthalate resin and also can enhance weld strength between welded molded products to be welded, and a core shell type elastomer having a glycidyl group is more preferable since balance between weld strength and flowability is satisfactory. Too large addition amount causes an increase in viscosity of a resin composition, and thus it becomes impossible to obtain a molded product due to deterioration of flowability. Therefore, the addition amount of the elastomer is preferably from 5 to 20 parts by mass, and more preferably from about 5 to 10 parts by mass, based on 100 parts by mass of the polybutylene terephthalate resin (A).

In order to impart desired properties to the polybutylene terephthalate resin composition of the present invention without exerting an adverse influence on weld strength between welded molded products to be welded, it is also possible to mix known substances, which are commonly added to a thermoplastic resin and a thermosetting resin, for example, stabilizers such as antioxidants, heat stabilizers, and ultraviolet absorbers; antistatic agents; colorants such as dyes and pigments; lubricants, plasticizers and crystallization accelerators, nucleating agents, hydrolysis improvers and the like.

It is not preferred that resins such as a styrene-acrylonitrile copolymer, a styrene-butadiene-acrylonitrile copolymer and the like are added so as to impart low warpage of a molded product since the resins cause a decrease in weld strength.

The resin composition used in the present invention can be easily prepared by using facilities and methods used commonly in a conventional method for preparation of a resin composition. For example, it is possible to use any of 1) a method in which the respective components are mixed and the mixture is kneaded and extruded by a mono or twin screw extruder to prepare pellets, followed by molding; 2) a method in which pellets, each having different composition, are once prepared and the pellets are mixed in a predetermined amount, followed by molding to obtain a molded product having the objective composition; and 3) a method in which one, or two or more component(s) is/are directly charged in a molding machine. Preferred is a method in which resin components are partially formed into fine powders and the powders are mixed with other components, followed by the addition of the mixture, in view of attaining uniform mixing of these components.

Welded Body

The welded body of the present invention is obtained by welding molded products, each being composed of the polybutylene terephthalate resin composition of the present invention, together.

The molded product composed of the resin composition of the present invention can be produced by molding the resin composition of the present invention by a conventionally known molding method. The conventionally known molding method includes, for example, an injection molding method.

The welded body of the present invention can be produced by welding the thus obtained plural molded products together. In the present invention, there is no particular limitation on the method of welding molded products together, and it is possible to use a conventionally known welding method. Examples thereof include vibration welding, ultrasonic welding, spin welding, heat ray welding, hot plate welding, and laser welding. There is no particular limitation on welding conditions in the case of performing welding, and it is possible to appropriately set according to the shape of a molded product.

In the above-mentioned welding method, bonding between molded products is performed by mixing a resin composition composing one molded product to be welded and a resin composition composing the other molded product together in the vicinity of the bonding portion between molded products in a molten state, followed by solidification. In the present invention, it is believed that a weight-average molecular weight of a polybutylene terephthalate resin is within a range of 60,000 or more and 80,000 or less, whereby, polymers become likely to be entangled together in mixed resin compositions to be mixed, leading to significant improvement in weld strength between welded molded products.

Among the above welding methods, preferred is a method in which molded products are abutted together to generate frictional heat on an abutting surface, thus performing welding. Examples of the method in which frictional heat is generated on an abutting surface, thus performing welding include a vibration welding method, an ultrasonic welding method and a spin welding method.

The vibration welding method is a method in which molded products are laid one upon another, leading to a state where an abutting surface formed by overlaying is pressure-contacted one upon another, and the molded products are welded by frictional heat which is generated by applying vibration in a lateral direction in this state.

The ultrasonic welding method is a method in which molded products are laid one upon another, leading to a state where an abutting surface formed by overlaying is pressure-contacted one upon another, and vibration in a vertical direction is generated on an abutting surface by ultrasonic wave in this state, thus welding the molded products by the frictional heat.

The spin welding method is a method in which molded products are laid one upon another, leading to a state where an abutting surface formed by overlaying is pressure-contacted one upon another, and frictional heat is generated by rotating one molded product at a high speed in this state, thus welding the molded products.

As mentioned above, according to the method for welding by frictional heat, molded products are welded together while applying a given pressure to an abutting surface formed by allowing molded bodies to lay one upon another. A resin composition melted by frictional heat may be pushed to flow by a pressure, thus being welded without a welding pressure being sufficiently applied. If the weight-average molecular weight of a polybutylene terephthalate resin is within a range of 60,000 or more and 80,000 or less, the molten resin composition has a viscosity to the extent of not being pushed to flow by a welding pressure, thus enabling welding between molded products while sufficiently applying the welding pressure.

EXAMPLES

The present invention will be described in more detail below by way of Examples, but the present invention is not limited thereto.

Materials

Details of components used, and methods for the evaluation of physical properties are as follows.
(A) Polybutylene terephthalate resin (PBT resin)
(A-1) PBT resin: manufactured by WinTech Polymer Ltd., weight-average molecular weight of 75,000, crystallization temperature of 192° C.
(A-2) PBT resin: manufactured by WinTech Polymer Ltd., weight-average molecular weight of 66,500, crystallization temperature of 193° C.
(A-3) PBT resin: manufactured by WinTech Polymer Ltd., weight-average molecular weight of 58,000, crystallization temperature of 195° C.
(A-4) PBT resin: manufactured by WinTech Polymer Ltd., weight-average molecular weight of 100,000, crystallization temperature of 190° C.
(A') Modified PBT resin
(A'-1) Modified PBT resin: manufactured by WinTech Polymer Ltd., weight-average molecular weight of 58,000, modified with 30 mol % isophthalic acid
(B) Glass fiber
(B-1) Glass fiber: T127, manufactured by Nippon Electric Glass Co., Ltd.
(C) Elastomer
(C-1) Glycidyl methacrylate-modified acrylic core shell polymer: EXL2314, manufactured by Rohm and Haas Company
(C-2) Acrylic core shell polymer: EXL2311, manufactured by Rohm and Haas Company
(C-3) Ethylene/glycidyl methacrylate-methyl methacrylate/butyl acrylate graft copolymer: Modiper A4300, NOF CORPORATION
(C-4) Ethylene-ethyl acrylate copolymer: NUC-6570, Nippon Unicar Company Limited Examples 1 to 7, and Comparative Examples 1 to 5

The respective components shown in Table 1 were weighed, dry blended, and then melt kneaded using a 30 mm² screw extruder TEX-30 manufactured by The Japan Steel Works, LTD. to prepare pellets (preparation conditions: cylinder temperature of 260° C., output of 15 kg/hour, screw speed of 130 rpm). Then, test pieces were produced from the pellets and various physical properties were evaluated. The results are collectively shown in Table 1.

Molecular Weight

Using the thus obtained pallets of a polybutylene terephthalate resin composition, the measurement was performed by a size exclusion chromatograph HLC-8120GPC, manufactured by TOSOH CORPORATION. Using Polymer Laboratories PL gel 5 µm MiniMIX-C as a column and $CHCl_3$ as an eluent, the measurement was performed at a flow rate of 0.5 ml/minute, a detector of UV/254 nm, and a temperature of 40° C., and then a weight-average molecular weight was converted from a standard sample Polystyrene Standards (Mw: 377,400 to 580) manufactured by Polymer Laboratories Ltd.

Melt Viscosity

Pellets were dried under the conditions at 140° C. for 3 hours, and then a melt viscosity (kPa·sec) was measured by a capirograph rheometer, manufactured by Toyo Seiki Seisaku-Sho under the conditions of an orifice diameter of 1.0 mm, a barrel diameter of 9.55 mm, a cylinder temperature of 260° C., and a shear rate of 1,000 $sec^{-1}$.

Flow Length

After drying pellets at 140° C. for 3 hours, a 2 mm thick bar-shaped test piece was molded, and then judgment was performed by a flow length (mm). Under the injection conditions of a cylinder temperature of 260° C., a mold temperature of 65° C., and an injection speed of 4 m/minute, the evaluation was performed by three levels of holding pressure (50 MPa, 75 MPa, 100 MPa).

Vibration Welding Strength

Using ROBOSHOT α100iA manufactured by FANUC Corporation, a test piece comprising two members having a sectional profile shown in FIG. 1 was molded under the conditions of a cylinder temperature of 260° C., an injection speed of 1 m/minute, a holding pressure of 60 MPa, a mold temperature of 80° C., an injection time of 25 seconds, and a cooling time of 10 seconds. FIG. 1 is a cross-section view schematically showing two molded products to be subjected to vibration welding, in which FIG. 1(a) is a view showing the whole and FIG. 1(b) is an enlarged view of a portion A surrounded by a dotted line in FIG. 1(a).

Then, a pressure was applied in a direction indicated by arrow B in FIG. 1(a), followed by abutting end faces (portion A at two locations in the drawing) of these two members. Using a vibration welding machine Orbital 100 manufactured by Emerson Japan, Ltd., two members were subjected to vibration welding, with respect to the abutted portion A, under the conditions of a frequency of 203 Hz, an actual pressure of 1.5 Bar, a welding width of 1.0 mm, and an amplitude of 0.8 mm. After welding, the test piece was partially cut and then punching shear strength was measured by a universal tester (Tensilon UTA-50kN, manufactured by ORIENTEC Co., Ltd.) at a speed of 5.0 mm/minute and the punching shear strength was regarded as a vibration welding strength.

Retention of Vibration Welding Strength after Cold Heat Treatment

The above test piece for the measurement of vibration welding strength was treated by 1 cycle of between "−40° C. for 30 minutes and 120° C. for 30 minutes" for 3,000 cycles, and then the weld strength was measured and retention to the weld strength before the treatment was determined.

Retention of Material Strength After Cold Heat Treatment

Using ROBOSHOT S2000i100B manufactured by FANUC Corporation, a tensile test piece was produced at a cylinder temperature of 260° C., an injection speed of 1 m/minute, a holding pressure of 60 MPa, and a mold temperature of 80° C. in accordance with ISO3167, and then the tensile strength was measured in accordance with ISO527.

The above tensile test piece was treated by 1 cycle of between "−40° C. for 30 minutes and 120° C. for 30 minutes" for 3,000 cycles, and then the tensile strength was measured and retention to the tensile strength before the treatment was determined.

Ultrasonic Welding Strength

Figure 2:
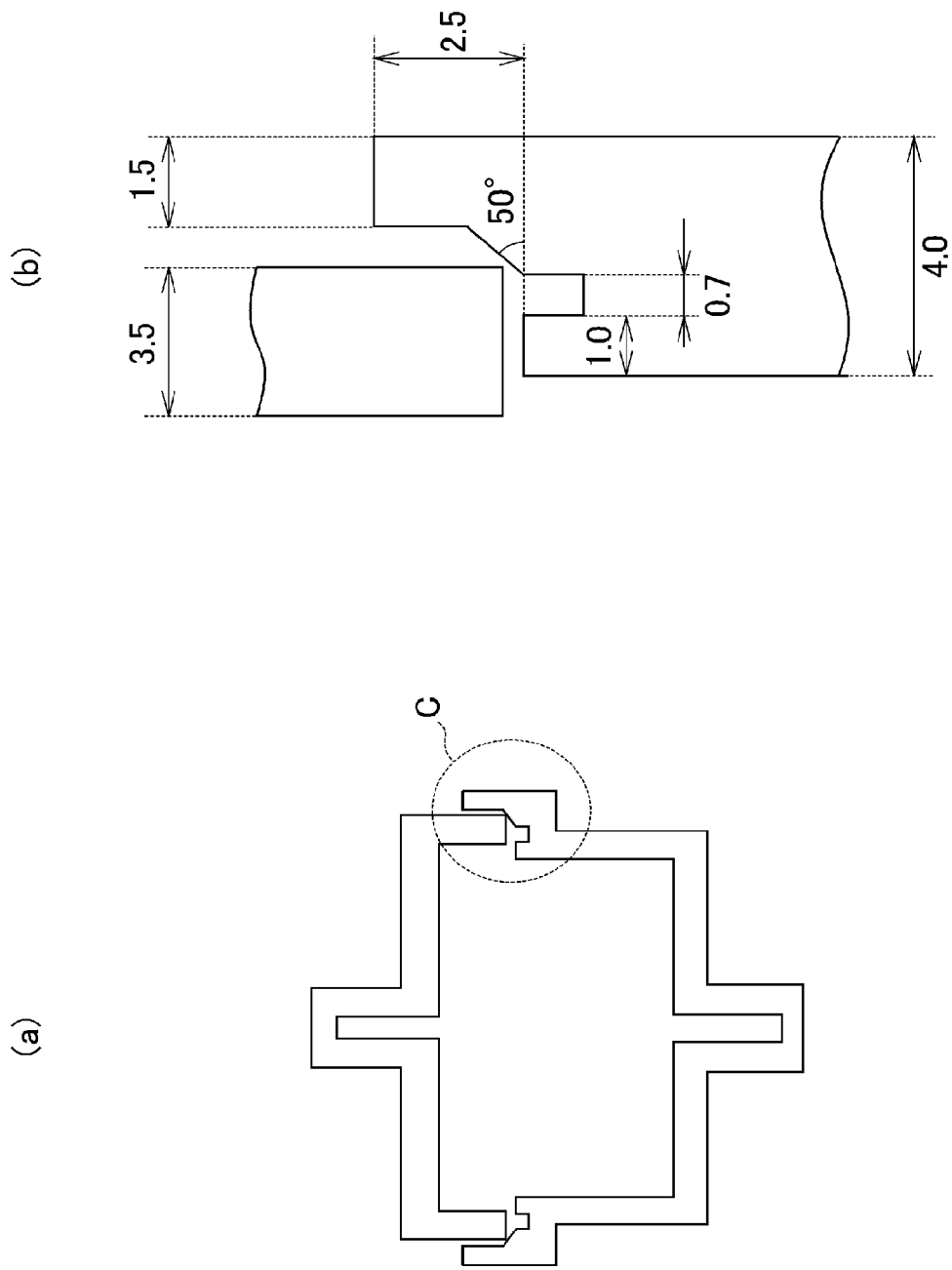

Using SE100D manufactured by Sumitomo Heavy Industries, Ltd., a test piece comprising two members having a sectional profile shown in FIG. 2 was molded under the conditions of a cylinder temperature of 260° C., an injection speed of 1 m/minute, a holding pressure of 70 MPa, a mold temperature of 80° C., an injection time of 10 seconds, and a cooling time of 10 seconds. FIG. 2 is a cross-section view schematically showing two molded products to be subjected to ultrasonic welding, in which FIG. 2(a) is a view showing the whole and FIG. 2(b) is an enlarged view of a portion C surrounded by a dotted line in FIG. 2(a).

Then, in the same manner as in the case of the above vibration welding, end faces (portion C at two locations in the drawing) of these two members were abutted, leading to a state where a pressure is applied. Using an ultrasonic welding machine SONOPETΣ-1200 manufactured by SEIDENSHA ELECTRONICS CO., LTD., two members were subjected to ultrasonic welding, with respect to the abutted portion C, under the conditions of a horn amplitude of 60 μm, an oscillation frequency of 20 kHz, an output of 1.2 kW, and a welding pressure of 0.1 MPa. After welding, the test piece was partially cut and then punching shear strength was measured by a universal tester (Tensilon UTA-50kN, manufactured by ORIENTEC Co., Ltd.) at a speed of 5.0 mm/minute and the punching shear strength was regarded as an ultrasonic welding strength.

together has high weld strength between welded molded products and is also excellent in heat shock resistance.

The results of "retention of material strength after cold heat treatment" revealed that, even if molded products, each being composed of a polybutylene terephthalate resin composition containing a polybutylene terephthalate resin having different molecular weight, are subjected to the same cold heat treatment, an influence of the molecular weight on the strength of the molded product per se was scarcely recognized. Nevertheless, the results of "retention of vibration welding strength after cold heat treatment" revealed that the molecular weight exerts an influence on heat shock resistance of the welded body, and excellent heat shock resistance was exhibited within a range of the molecular weight in the present invention. The above results revealed that the molecular weight of the polybutylene terephthalate resin particularly exerts an influence on properties of the welded body.

The invention claimed is:

1. A method of obtaining a welded body, comprising:
    providing at least two molded parts, each being composed of a polybutylene terephthalate resin composition, wherein the polybutylene terephthalate resin composition consisting of a thermoplastic resin blend, and an inorganic filler, wherein the thermoplastic resin blend consists of an unmodified polybutylene terephthalate resin and optionally an elastomer, where the weight-average molecular weight of the unmodified polybutylene terephthalate resin is 60,000 or more and 80,000 or less, wherein if the optional elastomer is present in the polybutylene terephthalate resin composition, the composition contains the optional elastomer in an amount of 5 to 20 parts by mass based on 100 parts by mass of the polybutylene terephthalate resin;
    placing the molded parts to abut each other at a contact surface;

TABLE 1

|  | Example | | | | | | | Comparative Example | | | | |
|---|---|---|---|---|---|---|---|---|---|---|---|---|
|  | 1 | 2 | 3 | 4 | 5 | 6 | 7 | 1 | 2 | 3 | 4 | 5 |
| A-1 |  | 100 |  | 100 |  |  |  |  |  |  |  |  |
| A-2 | 100 |  | 100 |  | 100 | 100 | 100 |  |  |  |  |  |
| A-3 |  |  |  |  |  |  |  | 100 |  | 100 | 100 | 100 |
| A-4 |  |  |  |  |  |  |  |  | 100 |  |  |  |
| A'-1 |  |  |  |  |  |  |  |  |  |  |  | 62 |
| B-1 | 43 | 43 | 46 | 46 | 46 | 46 | 46 | 43 | 43 | 46 | 55 | 81 |
| C-1 |  |  | 8 | 8 |  |  |  |  |  | 8 | 27 |  |
| C-2 |  |  |  |  | 8 |  |  |  |  |  |  | 27 |
| C-3 |  |  |  |  |  | 8 |  |  |  |  |  |  |
| C-4 |  |  |  |  |  |  | 8 |  |  |  |  |  |
| Melt viscosity (Pa · s) | 214 | 301 | 239 | 330 | 218 | 282 | 212 | 168 | 487 | 180 | 250 | 240 |
| Vibration welding strength (N) | 3333 | 4817 | 3818 | 5302 | 3135 | 4163 | 3372 | 2505 | Unmoldable | 2715 | 2800 | 3700 |
| Retention of vibration welding strength after cold heat treatment (%) | 98 | 98 |  |  |  |  |  | 82 | Unmoldable |  |  |  |
| Retention of material strength after cold heat treatment (%) | 110 | 112 |  |  |  |  |  | 109 | 110 |  |  |  |
| Ultrasonic welding strength (N) | 3160 | 3713 |  |  |  |  |  | 2435 | Unmoldable |  |  |  |
| Flow length (mm) Holding pressure: 50 MPa | 254 | 175 | 229 | 154 | 250 | 190 | 256 | 310 | 64 | 294 | 220 | 229 |
| Holding pressure: 75 MPa | 334 | 237 | 303 | 211 | 329 | 255 | 337 | 403 | 100 | 384 | 293 | 305 |
| Holding pressure: 100 MPa | 407 | 288 | 368 | 256 | 400 | 311 | 410 | 490 | 121 | 467 | 357 | 372 |
| Crystallization temperature (° C.) | 193 | 192 | 193 | 192 | 193 | 193 | 193 | 195 | 195 | 190 | 195 | 180 |

The results shown in Table 1 revealed that a polybutylene terephthalate resin composition containing a polybutylene terephthalate resin having a molecular weight within a specific range is excellent in flowability, and also a welded body obtained by welding molded products, each being composed of the resin composition of the present invention, moving the abutted molded parts relative to each other such that frictional heat causes the abutted molded parts to melt in the vicinity of the contact surface and causes melted polybutylene terephthalate resin composition from the abutted molded parts to flow and mix in vicinity of the contact surface; and cooling the melted polybutylene terephthalate thereby adhering the abutted molded parts into a single body.

2. The method of claim 1, wherein the weight-average molecular weight of the unmodified polybutylene terephthalate resin is 66,500 or more and 75,000 or less.

3. The method of claim 1, wherein the unmodified polybutylene terephthalate resin has a crystallization temperature of 190° C. or higher.

* * * * *